United States Patent [19]

Griest

[11] 3,781,094
[45] Dec. 25, 1973

[54] LIQUID COOLED MIRROR STRUCTURE
[75] Inventor: Raymond H. Griest, Los Angeles, Calif.
[73] Assignee: The United States of America as represented by the Secretary of the Air Force, Washington, D.C.
[22] Filed: Sept. 15, 1972
[21] Appl. No.: 289,692

[52] U.S. Cl. .................. 350/310, 350/288, 165/47, 165/168
[51] Int. Cl. .............................................. G02b 5/08
[58] Field of Search ........................... 350/288, 310; 165/47, 80, 168; 331/94.5

[56] References Cited
UNITED STATES PATENTS
3,708,223   1/1973   Sorensen ............................. 350/310
1,825,498   9/1931   Wogan ................................. 165/47

Primary Examiner—David Schonberg
Assistant Examiner—Michael J. Tokar
Attorney—Harry A. Herbert, Jr.

[57] ABSTRACT

A liquid cooled mirror structure having a body, inner plate and face sheet. The body has longitudinal channels therein, the inner plate has narrow channels therein perpendicular to the longitudinal channels and the face sheet has a dense pattern of grooves therein perpendicular to the narrow channels. In operation coolant flows horizontally through the longitudinal channels, vertically through the narrow channels and horizontally through the grooves thereby cooling the face sheet by providing a high intrinsic impedance to the coolant flow, and high specific heat transfer coefficient, with a minimum of pressure drop.

18 Claims, 5 Drawing Figures

LIQUID COOLED MIRROR STRUCTURE

BACKGROUND OF THE INVENTION

This invention relates generally to mirrors, and, more particularly, to liquid cooled mirrors used primarily in optical systems such as lasers.

The development of the laser has created a new area of technology which finds application in many systems already in existence today. For example, lasers can be found in the area of optical communications, holography, medicine, cutting, calculating and in radar. The utilization of the laser in such areas is in many instances dependent upon the amplification of the existing laser radiation. In order to accomplish such an increase in laser power it is necessary for the mirrors associated therewith to be cooled in order to accommodate the power.

In certain areas, such as in optical communication or optical radar, it is necessary to greatly amplify the initial radiation power produced by the laser. Heretofore, such an amplification proved to be highly impractical since the existing mirrors for high power lasers were insufficiently cooled. Since the optical figure of the mirror must be maintained, highly specialized structures are necessary to combine efficient cooling with stable support of the reflecting surface.

The prior art practice has evolved from thick solid copper structures in which the reflecting surface is supported on columns formed by coplanar sets of parallel holes drilled through the block and intersecting perpendicularly immediately below the reflecting surface. Water is circulated through the holes and the surface is thus cooled and supported so as to permit small lateral deflections of the reflecting surface resulting from thermal gradients across it through the compliance of the columns. Such a construction is limited to small sizes and limited flux densities since its limitations become prohibitive as the size and performance demands increase. Furthermore, in areas of use, wherein a large power output laser is required, the expense involved in cooling mirror structure of the past made the cost of the project or system prohibitive.

SUMMARY OF THE INVENTION

The mirror structure of the instant invention overcomes the problems set forth in detail hereinabove.

In this invention the novel construction of a mirror achieves exceptionally high rates of heat transfer. A well known principle of fluid dynamics, Reynold's Analogy, states that a high specific rate of heat flow into a coolant is always accompanied by a high specific impedance to the flow of the coolant. In the usual configuration of cooling devices the high specific impedance to coolant flow results in a high pressure drop. The purpose of this configuration is to permit the coolant to experience a very high specific impedance through very many fine channels each so short as to cause a very low pressure drop. The purpose of this configuration is to permit the coolant to experience a very high specific impedance through very many fine channels each so short as to cause a very low pressure drop. The purpose of this configuration is to permit the coolant to experience a very high specific impedance through very many fine channels each so short as to cause a very low pressure drop. This is accomplished by a manifolding system which directs coolant into a large number of photo etched grooves in the lower surface of the reflector sheet. These grooves are extremely small in diameter and short in length and the coolant flows directly from the entrance port to each groove in parallel with each other directly to the exit port. Thus, each groove whose dimensions are measured in thousandths of an inch, operates independently of all other grooves. Such a structure enables a laminar flow of coolant to flow through a system having a high specific impedance to the flow of coolant but with a minimum total pressure drop.

Furthermore, this cooling concept may have applications in many other fields where high rates of heat transfer from a solid surface to a fluid must be achieved with minimum pressure drop and in a minimum of space. Such other applications range from cooling dense assemblies of electronic equipment having high thermal dissipation, to making the thermal junction between a heat pipe and an external fluid.

It is therefore an object of this invention to provide a cooled mirror structure with significantly higher heat transfer efficiency than heretofore feasible.

It is another object of this invention to provide a cooled mirror structure wherein the flow of coolant to any area of the structure is independent of that to any other area and fixed local variations in thermal input can be corrected by local corrections in coolant flow.

It is still another object of this invention to provide a cooled mirror structure wherein thermally induced and pressure induced distortions are greatly reduced.

It is a further object of this invention to provide a cooled mirror structure which is economical to produce and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
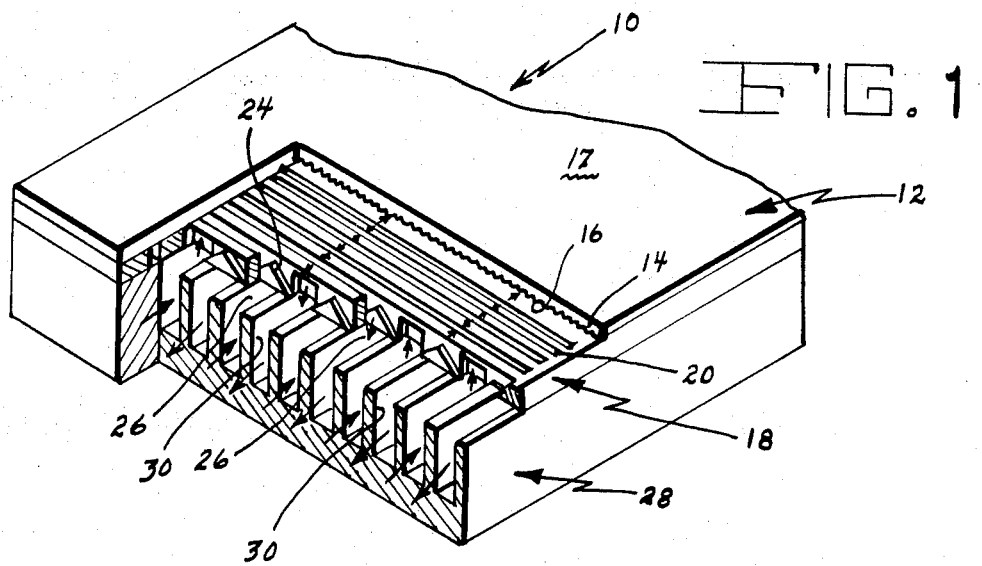
FIG. 1 is a pictorial view, shown partly in cross section, of the cooled mirror structure of this invention.
Figure 2:
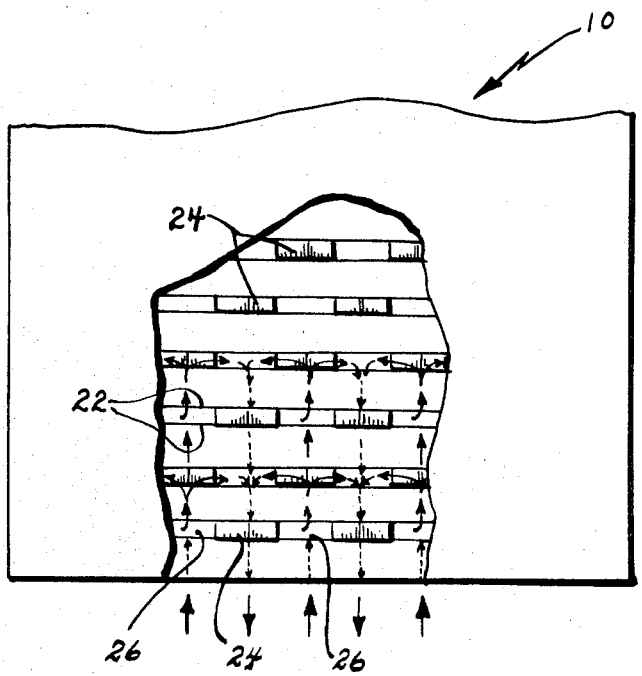
FIG. 2 is a plan view, shown partly in cross section, of the cooled mirror structure of this invention.

Reference is now made to FIGS. 1 and 2 of the drawing which best illustrate the structure of the cooled mirror 10 of this invention. This mirror 10 incorporates a high rate of heat transfer in a rigid body subject to negligible distortion.

To obtain a high coefficient of heat transfer, Reynold's analogy indicates that the channel conducting the coolant should have high intrinsic impedance to the flow of the coolant. Heretofore, this analogy has led to the use of swirl inducers to increase turbulence in order to increase both the impedance to flow and the cooling capacity. Further attemps, however, to increase the cooling capacity of such prior art mirrors by merely adding more swirl inducers or increasing the flow rate is limited by excessive pressure drop, distortion and vibration.

The mirror structure 10 of this invention incorporates a change from turbulent to laminar flow utilizing a high mechanical impedance with a minimum of pressure drop. Such a relationship is accomplished by the use of a thin sheet 12 made of any suitable material such as molybdenum having a surface 14 with a dense pattern of straight parallel fine square grooves 16 (shown in enlarged fashion in FIG. 3) cut therein. For a high impedance to coolant flow these grooves 16 must be made small as possible. If the instant structure is to be utilized as the mirror of a laser system the opposite surface 17 of sheet 12 should be made reflective. It should be noted, however, that although a reflective surface 17 is utilized in the preferred embodiment, that is, as a laser mirror, this surface may be made of any desired material or configuration.

Face sheet 12 is secured by any suitable molding method such as bonding to an inner plate 18. Plate 18 is made of any suitable material such as molybdenum and is pierced in any suitable manner by a set of parallel narrow channels 20 which are perpendicular to the grooves 16 in face sheet 12. The channels 20 have parallel walls 22 (see FIGS. 2 and 4) with opposite ends being triangular in configuration as shown at 24 in FIGS. 1, 2 and 3. The small ends of triangle 24 form the entrance and exit ports 26. This triangular configuration is produced by the formation of alternate triangles 24 integral with and located within channels 20 as clearly shown in FIGS. 1 and 3 and which are formed by any suitable technique such as a spark erosion method.

Plate 18 is fixedly secured by any suitable method to a base or body 28 made of any suitable material such as mullite (alumina-silica). Body 28 has a plurality of wider channels 30 therein (see FIG. 1) aligned to correspond with ports 26 of channels 20. The orientation of channels 30 being perpendicular to channels 20 and parallel to grooves 16. Channels 30 are further connected to the input and output ports (not shown) of mirror 10.

Figure 4:
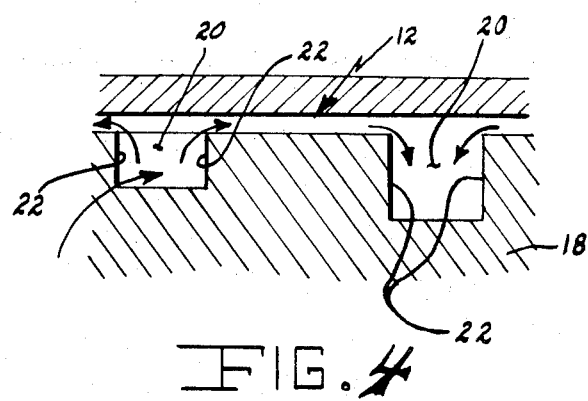
FIG. 4 is an enlarged side elevational view taken along line 4—4 of FIG. 3.

In operation any suitable coolant such as water flows horizontally through channels 30 in body 28 as shown in FIG. 1, vertically through channels 20 in plate 18 as shown in FIGS. 2 and 4 and horizontally through grooves 16 in face plate 12 where the heat transfer process takes place.

Figure 3:
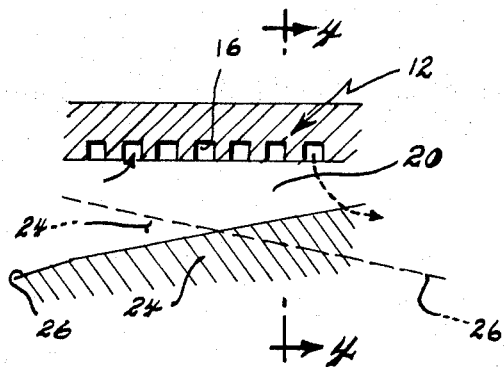
FIG. 3 is an enlarged side elevational view of a portion of the interior of a coolant channel of the cooled mirror structure of this invention.
Figure 5:
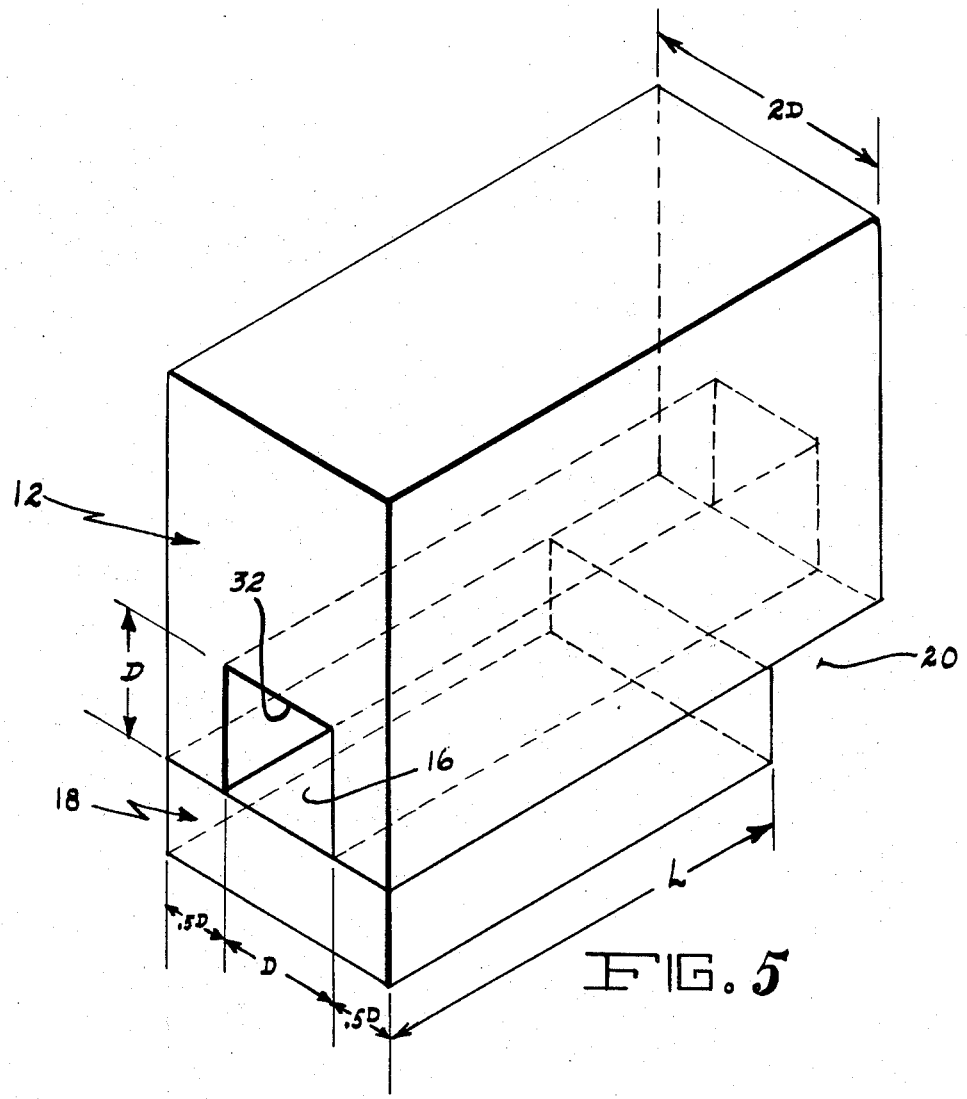
FIG. 5 is an exaggerated view of a coolant cell, illustrating the dimensions of the cooled mirror structure of the instant invention.

Reference is now made to FIG. 5 of the drawing which is an exaggerated cross section taken between grooves 16 of FIG. 3. The dimension D is determined by the cross section of groove 16 in face sheet 12 while the length L is determined by the thickness of the wall between channels 20 in plate 18. Such a relationship permits the flow of coolant to the intrinsically high impedance constrictions to be in parallel rather than in series and to be as nearly as possible at input temperature and pressure. The mirror structure 10 would therefore form an essentially monolithic structure, and consequently all parts should have the same coefficient of expansion, preferably as small as possible. Referring once again to FIG. 5, a physical interpretation of what takes place in the mirror structure 10 of this invention is that when heat is transferred from the wall 32 of groove 16 into the core of the moving fluid passing therethrough, it must pass through a thin laminar layer of the fluid immediately adjacent wall 32. This laminar layer acts as an impedance to the flow of heat and to minimize this impedance to the flow of heat, the ratio of wall area to core area should be large. This ratio varies inversely with the diameter D of the groove 16 and to achieve maximum cooling efficiency the flow should be entirely laminar and the diameter D should be as small as possible. Furthermore, the groove length L should be short to limit the pressure drop and temperature rise of the coolant and to take advantage of the high transfer coefficient known to exist at the entrance of the groove 16.

It is therefore evident that the mirror structure of the instant invention accomplishes any needed cooling in, for example, a high power laser system by (1) utilizing a laminar flow; (2) providing a high intrinsic impedance to the flow of coolant; (3) providing a low impedance to the flow of heat; and (4) minimizing the pressure drop and temperature rise of the coolant.

Although this invention has been described with reference to a particular embodiment it will be understood to those skilled in the art that this invention is also capable of a variety of alternate embodiments within the spirit and scope of the appended claims. For convenience in fabrication the face sheet 12 and plate 18 might be made of the same metal but the body 28 might be made of any other material with a matching thermal expansion. One such combination is molybdenum for the face sheet 12 and plate 18 and mullite (alumina-silica) for the body 28. The molybdenum structure might even be epoxied to the base 28, or if desired, a suitable glass could be used. Other combinations might be berryllia — porcelain. Berryllia combines a thermal conductivity approaching that of copper with a coefficient of thermal expansion in the range of the porcelains. The coolant channels could be formed in the porcelain plate while green and it could then be fired or they might be cut in the fired material by supersonic techniques. A suitably formulated glass can be used as the bonding agent and the mirror would become a monolithic ceramic structure.

I claim:

1. A liquid cooled structure comprising a body portion, said body portion having a plurality of longitudinal channels therein, a plate fixedly secured to said body, said plate having a plurality of narrow channels therein perpendicular to said longitudinal channels, said narrow channels having entrance and exit ports operatively connected to said longitudinal channels, and a face sheet fixedly secured to said plate, said face sheet providing a plurality of paths therein for the flow of coolant from said channels in said plate, whereby coolant flows horizontally through said longitudinal channels, vertically through said entrance and said exit ports of said narrow channels and horizontally through said paths thereby cooling said face sheet by providing a high intrinsic impedance to said coolant flow with a minimum of pressure drop.

2. A liquid cooled structure as defined in claim 1 in which at least one dimension of the cross-section of said coolant path is in the least practicable ratio to the effective length of said path.

3. A liquid cooled structure as defined in claim 1 wherein said paths are in the form of a dense pattern of straight parallel grooves.

4. A liquid cooled structure as defined in claim 3 wherein said narrow channels have a plurality of alternate triangles therein, the small ends of said triangles forming said entrance and exit ports.

5. A liquid cooled structure as defined in claim 4 wherein said face sheet and said plate are made of the same material and said body is made of another material of matching thermal expansion.

6. A liquid cooled structure as defined in claim 4 wherein said grooves have an extremely fine square configuration.

7. A liquid cooled structure as defined in claim 6 wherein said face sheet has a reflective surface on one side thereof.

8. A liquid cooled structure as defined in claim 6 wherein said triangles are integral with said plate and are formed by a spark erosion technique.

9. A liquid cooled structure as defined in claim 8 wherein said face sheet has a reflective surface on one side thereof.

10. A liquid cooled structure as defined in claim 9 wherein said face sheet and said plate are made of the same material and said body is made of another material having matching thermal expansion.

11. A liquid cooled structure comprising a body portion, said body portion having a plurality of channels therein, a plate fixedly secured to said body, said plate having a plurality of channels therein in the face opposite said body portion and a plurality of small openings connecting in alternate regular succession said channels in said body portion and said channels in said plate and serving as entrance and exit ports for the flow of liquid coolant into and out of successive adjacent channels in said plate, and a face sheet having a plurality of paths for the flow of coolant, said paths being connected to said channels in the said plate, said paths being parallel to the surface of said face sheet.

12. A liquid cooled structure as defined in claim 11 in which at least one dimension of the cross-section of said coolant path is in the least practicable ratio to the effective length of said path.

13. A liquid cooled structure as defined in claim 11 wherein said paths are in the form of a dense pattern of straight parallel grooves.

14. A liquid cooled structure as defined in claim 13 wherein said channels in said plate have a plurality of alternate triangles therein, the small ends of said triangles defining said small openings.

15. A liquid cooled structure as defined in claim 14 wherein said face sheet and said plate are made of the same material and said body is made of another material of matching thermal operation.

16. A liquid cooled structure as defined in claim 14 wherein said grooves have an extremely fine square configuration.

17. A liquid cooled structure as defined in claim 16 wherein said face sheet has a reflective surface on one side thereof.

18. A liquid cooled structure as defined in claim 4 wherein said grooves are formed by a photo etching technique.

* * * * *